US011651951B2

(12) United States Patent
Valouch et al.

(10) Patent No.: US 11,651,951 B2
(45) Date of Patent: May 16, 2023

(54) DEVICE AND METHOD FOR GENERATING RADIATION

(71) Applicant: TRINAMIX GMBH, Ludwigshafen am Rhein (DE)

(72) Inventors: Sebastian Valouch, Ludwigshafen (DE); Robert Send, Karlsruhe (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 17/756,623

(22) PCT Filed: Dec. 2, 2020

(86) PCT No.: PCT/EP2020/084223
§ 371 (c)(1),
(2) Date: May 27, 2022

(87) PCT Pub. No.: WO2021/110721
PCT Pub. Date: Jun. 10, 2021

(65) Prior Publication Data
US 2023/0030256 A1    Feb. 2, 2023

(30) Foreign Application Priority Data
Dec. 3, 2019    (EP) .................... 19213277

(51) Int. Cl.
*H01K 1/58* (2006.01)
*H01K 1/20* (2006.01)
*H01K 7/00* (2006.01)

(52) U.S. Cl.
CPC ............. *H01K 1/58* (2013.01); *H01K 1/20* (2013.01); *H01K 7/00* (2013.01)

(58) Field of Classification Search
CPC ............... H01K 1/58; H01K 1/20; H01K 7/00
See application file for complete search history.

(56) References Cited

U.S. PATENT DOCUMENTS 7,804,233 B1 * 9/2010 Sundhar .................. H01K 1/64
313/578

FOREIGN PATENT DOCUMENTS

EP    0689229 A2    12/1995
EP    0787282 A1    8/1997
(Continued)

OTHER PUBLICATIONS

Helioworks, Inc. "Pulsable IR Source—Model EF-8531." Available at <www.helioworks.com>.
(Continued)

*Primary Examiner* — Anne M Hines
(74) *Attorney, Agent, or Firm* — Armstrong Teasdale LLP

(57) ABSTRACT

Described herein is a device and a method for generating radiation, in particular pulsed radiation, specifically within the infrared spectral range. Also described herein is a computer program product which includes executable instructions for performing the method. The device for generating radiation includes at least one radiation emitting element, where the radiation emitting element is designated for generating radiation upon being heated by an electrical current; a mount, where the mount carries the at least one radiation emitting element, and where the mount or a portion thereof is movable; and a heat sink, where the heat sink is designated for cooling the mount and the at least one radiation emitting element being carried by the mount upon being touched by the mount. The device, the method, and the computer program product can be used in a spectroscopic application.

17 Claims, 3 Drawing Sheets

(56) References Cited

FOREIGN PATENT DOCUMENTS

| GB | 2502520 A | 12/2013 |
|---|---|---|
| JP | 2004206943 A | 7/2004 |
| WO | 2019143294 A1 | 7/2019 |

OTHER PUBLICATIONS

HelioWorks, Inc. "Pulsable IR Source—Model EP-3965." Available at <www.helioworks.com>.
ICX Photonics. "Broadband Pulsed Infrared Light Sources." Available at <www.amstechnologies.com/fileadmin/amsmedia/downloads/2533_IR_Broadband_Sources.pdf>.
International Search Report and Written Opinion for corresponding PCT/EP2020/084233 dated Feb. 22, 2021, 10 Pages.

* cited by examiner

DEVICE AND METHOD FOR GENERATING RADIATION

CROSS-REFERENCE TO RELATED APPLICATIONS

This application is a U.S. National Phase Application of PCT/EP2020/084223, filed Dec. 2, 2020, which claims the benefit of priority to European Patent Application No. 19213277.7, filed Dec. 3, 2019, the entire contents of which are hereby incorporated by reference herein.

FIELD OF THE INVENTION

The invention relates to a device and a method for generating radiation, in particular pulsed radiation, specifically within the infrared spectral range, wherein the generated radiation may preferably comprise an emission spectrum being similar to that of a thermal radiation source, in particular an incandescent lamp or a thermal infrared emitter. Further, the invention relates to a computer program product which comprises executable instructions for performing the method. The device, the method, and the computer program product can, in particular, be used in a spectroscopic application, especially in the infrared spectral range, wherein the device may, preferably, be used as illumination source. However, further kinds of applications may be conceivable.

PRIOR ART

Various devices and methods for generating radiation, in particular pulsed radiation, within the infrared spectral range, specifically at wavelengths of 1.5 µm to 15 µm, are known.

For this purpose, comprehensive and expensive radiation generators which are based on semiconductors, such as light-emitting diodes, or lasers, specifically quantum cascade lasers, can be used, thus, allowing a modulation frequency of 100 Hz and more. As a result, the modulation frequency neatly fits with a range of detectivity of infrared sensors, such as PbS or PbSe sensors, which are particularly sensitive at 500 Hz or above, especially due to a strong impact of 1/f noise.

A cheap and simple alternative is provided by pulsable infrared sources which comprise a low thermal-mass filament of Tungsten or NiCr. This kind of pulsable infrared sources emits in a wavelength range from 2 µm to 20 µm and can, however, be pulsed only at modulation frequencies up to 30 Hz, more typically up to 10 Hz, thereby exhibiting a temperature modulation of several 100 K. By way of example, such kind of pulsable infrared sources is available from Helioworks' EP-Series or EF-Series (refer to www.helioworks.com), or as FLIR from ICx Photonics (refer to www.amstechnologies.com/fileadmin/amsmedia/downloads/2533_IR_Broadband_Sources.pdf). Thus, in order to achieve a higher modulation frequency, cheap infrared sources are modulated by using a mechanical chopper wheel which, however, is not feasible for being introduced into a miniaturized infrared spectrometer.

Further technological background with respect to the present invention can be found in any one of GB 2 502 520 A, EP 0 787 282 A1, WO 2019/143294 A1, EP 0 689 229 A2, and JP 2004 206943 A.

Despite the advantages implied by the above-mentioned methods and devices, there still is room for improvements with respect to a simple, cost-efficient and reliable device and method for generating radiation, in particular pulsed radiation, specifically within the infrared spectral range, in particular for being used as an illumination source in a spectroscopic application.

Problem Addressed by the Invention

Therefore, a problem addressed by the present invention is that of specifying a device and a method for generating radiation as well as a computer program product comprising executable instructions for performing the method, which at least substantially avoids the disadvantages of known devices and methods of this type.

In particular, it is desired to present a cost-effective, miniaturized device which is designated for generating radiation, in particular pulsed radiation, over a broad wavelength range which, specifically, covers a portion of the infrared spectral range, particularly selected from the wavelength range of 1.5 µm to 15 µm.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a device for generating radiation, in particular pulsed radiation, specifically within the infrared spectral range is disclosed. The device comprises:
  at least one radiation emitting element, wherein the radiation emitting element is designated for generating radiation upon being heated by an electrical current;
  a mount, wherein the mount carries the at least one radiation emitting element, and wherein the mount or a portion thereof is movable; and
  a heat sink, wherein the heat sink is designated for cooling the mount and the at least one radiation emitting element being carried by the mount upon being touched by the mount.

As generally used, the term "device" refers to a physical unit which comprises the above-listed components. Herein, the listed components may be separate components. Alternatively, two or more of the components may be integrated into a common component. Further, the device or at least one component thereof may be integrated into a further device as a portion thereof, wherein the further device may, preferably, be a spectrometer device as described below in more detail or a portion thereof. However, an at least partial integration of the device or a portion thereof in a different further device may also be feasible.

As used herein, the term "radiation" refers to an emission of photons which are generated by the device, preferably in a fashion that the wavelengths of the emitted photons cover a considerably wide spectral range which, specifically, comprises the infrared spectral range.

As generally used, the term "infrared spectral range" refers to a range of wavelengths covering 780 nm to 1000

μm, wherein the wavelength range of 1.5 μm to 3 μm is usually designated as "short-wavelength infrared" and the wavelength range of 3 μm to 8 μm as "mid-wavelength infrared", while the wavelength range of 8 μm to 15 μm is usually designated as "long-wavelength infrared". Specifically, a wavelength range of 1 μm, 1.5 μm, 2 μm, 3 μm, or 5 μm up to 8 μm, 15 μm, 50 μm, or 100 μm, i.e. a wavelength range covering the short-wavelength, the mid-wavelength and, optionally, the long-wavelength infrared, is particularly preferred for the purposes of the present invention.

As further used herein, the term "generating radiation" refers to a procedure of emitting photons having a particular wavelength within a desired wavelength range from a body by applying an impact to the body in a fashion that the desired effect can be achieved. With regard to the present invention, the body is or comprises at least one radiation emitting element which is designated for being impinged by an electrical current comprising electrons which are designed for heating the at least one radiation emitting element in a fashion that the desired photons are emitted.

As used herein, the term "radiation emitting element" refers to a thermal radiation source which is capable of generating radiation which, in particular, covers at least a portion of the infrared spectral range by the application of an electrical current. As used herein, the term "thermal radiation source" refers to an illumination source which is designed for emitting radiation in a thermal process, especially in at least a portion of the visible and infrared spectral ranges. For this purpose, the radiation emitting element may have a large surface in order to contribute to an effective generation of radiation. Preferably, the radiation emitting element may, thus, comprise a metal filament or a metal film having a low electrical conductivity, specifically selected from at least one of tungsten or NiCr, or a graphite filament or a graphite film comprising graphite which also has a low electrical conductivity. As generally used, the term "filament" refers to a thread-like structure comprising the metal, wherein the thread-like structure may, preferably, be provided in form of a spiral-like structure, thus providing a large surface area. Especially, the radiation emitting element could be or comprise a thermal infrared emitter. As used herein, the term "thermal infrared emitter" refers to a micro-machined thermally emitting device which comprises a radiation emitting surface which is designated for emitting the desired radiation. By way of example, thermal infrared emitters are available under the name "emirs50" from Axetris AG, Schwarzenbergstrasse 10, CH-6056 Kägiswil, Switzerland, as "thermal infrared emitters" from LASER COMPONENTS GmbH, Werner-von-Siemens-Str. 15 82140 Olching, Germany, or as "infrared emitters" from Hawkeye Technologies, 181 Research Drive #8, Milford Conn. 06460, United States. However, further types of thermal infrared emitter may also be feasible.

For a purpose of generation radiation, the electrical current can, thus, be applied in a manner that it may impinge the at least one radiation emitting element as long as desired and can, subsequently, be switched off in order to terminate a further generation of photons. However, as a physical side effect, the heat dissipates through the at least one radiation emitting element to the mount which carries the at least one radiation emitting element, both of which are, therefore, heated up by the electrical current. As a consequence thereof, particularly due to a large hot thermal mass of the mount, the at least one radiation emitting element continues a further generation of photons as long as sufficient heat is available unless a cooling process may arrange for a temperature of the at least one radiation emitting element which is too low for further generating photon, whereby the generation of the radiation is terminated.

Therefore, in order to provide a device for generating pulsed radiation it would be desirable to accelerate the cooling process to, firstly, allow terminating the generation of photons and, subsequently, resuming the generation of photons after a time interval. Thereby, a "modulation frequency" may be defined as a reciprocal value of a time which covers both a single heating process and subsequent cooling process applied to the at least one radiation emitting element. As used herein, a portion of this time which is used for the single heating process can also be denoted as a "heating phase" in which the mount is decoupled from the heat sink, while the portion of this time which is used for the single cooling process in which the mount is coupled to the heat sink can also be denoted as a "cooling phase". As indicated above, it would be desirable that the device for generating the pulsed radiation may exhibit a high modulation frequency by a significantly improved occurrence of coupling and decoupling the at least one radiation emitting element to and from the heat sink. Herein, the modulation frequency may, preferably, assume at value of 0.01 Hz, 0.1 Hz, 0.5 Hz, 1 Hz, 5 Hz, 10 Hz up to 50 Hz, 100 Hz, 200 Hz, 250 Hz, 500 Hz, 1 kHz or above.

Thus, in order to accelerate the cooling process, it is desirable to provide a more effective cooling. For this purpose, the device for generating radiation according to the present invention further comprises a heat sink. As generally used, the term "heat sink" refers to a heat accepting body which is designated for accepting an amount of heat from a volume surrounding the heat sink. For this purpose, the heat accepting body may, typically, comprise at least one of a sufficient amount of a heat accepting volume, which can also denoted by the term "cold thermal mass", having at least one heat accepting material and a high thermal conductivity. In general, using a high thermal conductivity may allow reducing the heat accepting volume while having a high heat accepting volume may do it with a lesser value of the thermal conductivity. As generally used, the term "thermal conductivity" refers to an ability of the heat accepting material to receive and transfer heat from the surrounding volume. Therefore, the heart sink may, preferably, be selected from a metal block or a base of the device. Herein the metal block may, preferably, be selected from a metal, such as copper, which is easily available and known to have a large thermal conductivity. In addition or as an alternative, the device according to the present invention can comprise a base which may have a large heat accepting volume having an acceptable thermal conductivity, thus, being suitable for the purpose of a heat sink.

In a particular embodiment of the present invention, the device may, in addition, comprise a cooling unit being designed for actively or passively cooling the heat sink. As generally used, the term "passively cooling" relates to a unit which is capable of receiving heat without using energy for this purpose, such as further heat sink, a further body attached to the heat sink, such as a base of the device, or an arrangement by which a dissipation of the heat is supported by a particularly selected form of the body and/or by the environment of the body to be cooled. In contrast hereto, the term "actively cooling" refers to a unit which is designated for cooling the body by employing additional energy, in particular, for moving a coolant, specifically a gas or a liquid, which receives an amount of heat from the body in a direction away from the body, a fan, or a thermoelectric device. However, further kinds of cooling devices may also be feasible.

In order to initiate the desired effective cooling, the device for generating radiation according to the present invention is arranged in a fashion that the heat sink may allow cooling both the mount and the at least one radiation emitting element which is carried by the mount upon being touched by the mount. However, a constant contact of the mount with the heat sink is detrimental since it may impede the heating of the at least one radiation emitting element being carried by the mount in order to generate the desired radiation as described above and below in more detail.

Therefore, in order to initiate the desired effective cooling of the at least one radiation emitting element during the cooling phase without impeding the heating of the at least one radiation emitting element during the heating phase, the mount as comprised by the device according to the present invention or a portion thereof is movable. As generally used, the term "movable" refers to a property of a body or a portion thereof which describes that the whole body or the respective portion thereof can take a different location in space at different times. As a result, in a first instance, the whole body can assume a first location at a first time and a second location differing from the first location at a second time. Alternatively or in addition, in a second instance, a particular portion of the body can assume the first location at the first time and the second location differing from the first location at the second time, wherein other portions of the body may rest at the same position at the first time to the second time. While the whole body is movable in the first instance, in the second instance the body can be considered as "flexible", thus, allowing a portion of the body to alter position while other portions of the body can remain at a fixed location.

Thus, in a first embodiment, the whole mount can be provided as a movable mount being movable from a first location at which it is separated from the heat sink, in particular by a gap, to a second location at which it touches the heat sink. Alternatively or in addition, in a second embodiment, the mount can be provided as a flexible mount being arranged in a fashion that a first portion of the mount may be fixed to a base of the device while a second portion of the mount can be adjustable between the first location at which it is separated from the heat sink, in particular by a gap, to the second location at which it touches the heat sink. Irrespective whether the whole mount or the respective portion of the mount is movable between the first location and the second location, the mount or the respective portion thereof may, preferably, assume the first location during the heating phase and the second location during the cooling phase and can, thus, act as a "switch" which is switchable between the first location and the second location and, vice versa, between the second location and the first location. As a result, the desired effective cooling of the at least one radiation emitting element can be performed during the cooling phase along which the mount or the respective portion thereof may, preferably, assume the second location touching the heat sink, whereby the heating of the at least one radiation emitting element may be performed during the heating phase along which the mount or the respective portion thereof may, preferably, assume the first location at which it may be separated from the heat sink. Consequently, the movable property of the mount or the portion thereof may allow performing the heating process and the cooling process without impeding each other, thus, contributing to an effective heating and subsequent cooling of the at least one radiation emitting element, thus being capable of providing a desired pulsed radiation source which, especially, covers a portion of the infrared spectral range.

Not wishing to be bound by theory, the modulation frequency of the at least one radiation emitting element is limited, on one hand, by a thermal mass of the at least one radiation emitting element and, on the other hand, by a thermal conductivity of the at least one radiation emitting element, wherein both the thermal mass and the thermal conductivity influence the heating process and the cooling process. For accelerating the heating process, a small thermal mass of the at least one radiation emitting element and a low thermal conductivity of the at least one radiation emitting element to an environment would be desirable to reduce heating power. For the cooling process, however, a high thermal conductivity of the at least one radiation emitting element to the environment would be desirable. These opposing construction requirements can be eliminated by the particular arrangement provided by the device according to the present invention, in particular by mechanically actuating the at least one radiation emitting element and bringing it into thermal contact with the large thermal mass provided by the heat sink. As a result of the thermal contact of the small hot thermal mass of mount to the large cold thermal mass of the heat sink, both the mount and the at least one radiation emitting element carried by the mount cool down rapidly.

For a purpose of providing the switch which is switchable between the first location and the second location and, vice versa, the mount can, preferably, be arranged in form of a movable electrode carrying the at least one radiation emitting element while the heat sink can be a metal block assuming the form of a fixed electrode, optionally extended by a base of the device or a portion thereof. Herein, the movable electrode may be separated from the fixed electrode by a gap during the heating phase, whereas the gap can be closed during the cooling phase in a manner that the movable electrode may touch the fixed electrode, generating a heat transfer from the at least one radiation emitting element being carried by the movable electrode through the movable electrode to the fixed electrode which is designed as the heat sink. For a purpose of moving the movable electrode, an electrical voltage may be applied which may generate an electrostatic force that pulls the movable electrode to the fixed electrode during the whole cooling phase or at least during the initial cooling phase, depending whether the electrical voltage may be applied in order to move the movable electrode or to keep the movable electrode in the second location touching the fixed electrode. As an alternative, the electrical voltage which may generate an electrostatic force that pulls the movable electrode to the fixed electrode may be applied during the whole heating phase in order to keep the movable electrode away from the heat sink. However, further arrangements designated for moving the movable electrode may also be conceivable.

In a particularly preferred embodiment, the at least one radiation emitting element as well as the movable mount which is designated to carry the at least one radiation emitting element, may be or comprise a micro-electromechanical structure (MEMS). This kind of arrangement may, especially, be adapted of providing a cost-effective miniature radiation device, in particular a cost-effective miniature pulsed radiation device. For this purpose, the mount as used in the device according to the present invention may, preferably, not only be selected from a micro-electromechanically structured movable electrode but, alternatively, also from at least one of a cantilever or a membrane. As generally used, the term "cantilever" refers to a flexible elongated tongue being substantially extended in a single dimension and being fixed at a first end and movable within a specific range at a second end, while the term "membrane" relates to a thin structure having a rim, being extended in two dimensions, being fixed at a first position at the rim, and being movable within a specific range at opposing positions at the rim. However, further micro-electromechanical structures may also be feasible.

In a particular embodiment, the membrane can be or comprise an optical filter for filtering the generated radiation, in particular selected from at least one of an absorption filter, in particular a high pass filter, a low pass filter, or band pass filter; or a photonic crystal. By way of example, a band pass filter may be placed in front of the radiation emitting element. Alternatively, a photonic crystal may be placed in front of the radiation emitting element. As generally used, the term "photonic crystal" refers to a periodic optical nanostructure which is designed for affecting a propagation of the photons within the nanostructure, in particular in a fashion that at least one disallowed energy band may be generated, wherein the propagation of the photons is inhibited. As a result thereof, the photonic crystal can act as filter for wavelengths within the disallowed energy bands. Thus, the photonic could, preferably, be used for filtering infrared emission and/or directing it to a desired direction. By way of example, the photonic crystal as used in the FLIR device manufactured by ICx Photonics as indicated above can be adapted to the present device. However, further kinds of optical filters may also be feasible.

During the heating phase, the micro-electromechanical structure may assume a "free-standing configuration" which indicates that the micro-electromechanical structure does not touch the heat sink, particularly selected from at least one of a metal block or a base of the device, whereas, during the cooling phase, the micro-electromechanical structure may touch the heat sink, generating the desired heat transfer from the at least one radiation emitting element carried by the micro-electromechanical structure through the micro-electromechanical structure to the heat sink. Herein, it may be preferable to apply an electrical voltage to the micro-electromechanical structure during the initial cooling phase or during the whole cooling phase, either for moving the micro-electromechanical structure from the free-standing configuration to the heat sink or for keeping the micro-electromechanical structure in a position in which it touches the heat sink. As an alternative, the electrical voltage may be applied during the whole heating phase for keeping the micro-electromechanical structure separated from the heat sink.

However, moving the micro-electromechanical structure and/or keeping it in a desired position could also performed in a different fashion.

In a particular embodiment, the micro-electromechanical structure may be integrated in a cavity, in particular a Fabry-Perot cavity. Specifically, the device may comprise a housing which can be formed in a fashion that the cavity may be provided. As generally used, the term "cavity" refers to a linear optical resonator, wherein a length of the resonator determines wavelengths allowed within the resonator. Further, the term "Fabry-Perot cavity" relates to a particular kind of cavity which comprises at least two highly-reflective mirrors, wherein at least one mirror has a small transmissivity, thus, allowing a small portion of the radiation being captured in the cavity to leave the cavity as emitted radiation. For this purpose, the device may comprise at least two mirrors in a parallel arrangement and, preferably, being movable with respect to each other, whereby the wavelengths emitted by the device are determined. Consequently, this particular embodiment, advantageously, allows providing filtered and tunable infrared emission.

In a further particular embodiment, the mount may be or comprise a bimetallic structure. As generally used, the term "bimetallic structure" refers to a body comprising at least two different kinds of metals, preferably in form of bimetallic strips, joined together. By altering the temperature, the difference in thermal expansion rates for each metal results in a movement of a portion of the bimetallic structure while a further portion can be kept at a fixed position. With regard to the device according to the present invention, the bimetallic structure may, thus, preferably be designed in a fashion that it may move away from the heat sink upon being impinged by heat, wherein the heat may be provided by the at least one radiation emitting element. In a particularly adapted arrangement in which the bimetallic structure is used as the mount, the mount may, therefore, be automatically separated from the heat sink during the heating phase while it may touch the heat sink during the cooling phase, without being required to use any external triggering. As a result, a self-resonant pulsed infrared emitter can be provided in this manner.

In a particularly preferred embodiment, at least some components of the device, in particular the radiation emitting element, the mount and a surface of the heat sink designed for being touched by the mount, may be comprised by a volume which may, preferably, be filled with inert gas or comprise a vacuum, especially in order to protect the device or the at least some components thereof from an environment, such as a harsh environment, thus, allowing an operation of the device under clearly defined conditions. Herein, the volume may have a confinement, preferably a bulb, wherein the confinement can, preferably, comprise a material that may, particularly, be adapted to the emission spectrum of the generated radiation, thus, allowing a large portion of the generated radiation to pass through the confinement. A suitable material may be selected from glass or fused quartz. However, further kinds of protective arrangements may also be feasible.

In a further preferred embodiment, the device according to the present invention may, in addition, comprise at least one control unit. As used herein, the term "control unit" generally refers to a unit which is designed for controlling at least one parameter related to the device, in particular at least one parameter selected from a duration of the heating phase, an amount of electrical current provided to the at least one radiation emitting element, a duration of the cooling phase, an amount of electrical voltage applied to the mount, or a modulation frequency. However, other kinds of parameters to be controlled by the control unit may also be conceivable. For this purpose, the control unit may be or comprise at least one integrated circuit, such as an application-specific integrated circuit (ASIC), at least one field programmable gate array (FPGA), at least one digital signal processor (DSP), and/or at least one data processing device, such as at least one computer, preferably at least one microcomputer and/or microcontroller. Additional components may be comprised, such as at least one preprocessing device and/or data acquisition device, such as at least one device for receiving and/or preprocessing of signals, such as at least one AD-converter and/or one filter. Further, the control unit may comprise at least one data storage device. Further, the control unit may comprise at least one interface, such as a wireless interface and/or a wire-bound interface. Further, a data processing device already comprised by an electronic communication unit, specifically a smartphone or a tablet, for various purposes can also be used as the control unit. Further, a data processing device already comprised by a spectrometer device could also be used as the control unit.

In a further aspect of the present invention, a spectrometer device is disclosed. According to the present invention, the spectrometer device comprises:
- an illumination source, wherein the illumination source is designated for illuminating an object in order to record a spectrum of the object;
- a detector array comprising a plurality of radiation sensitive sensors, wherein the detector array is designated for recording the spectrum of the object by generating at least one sensor signal;
- a spectrometer control unit, wherein the spectrometer control unit is designated for determining the spectrum of the object from the at least one sensor signal, wherein the illumination source comprises the device for generating radiation as described herein for illuminating the object.

As a consequence, the device according to the present invention, which can also be denoted as a "IR pulse generator", may, in this preferred embodiment, be comprised by the spectrometer device in an integrated fashion. However, as an alternative, the device according to the present invention may, as described elsewhere herein, be provided as a separate unit which may, preferably, be attachable to an arbitrary spectrometer device, in particular, for being used as an illumination source. Irrespective of the embodiment of the device, it may, in particular, be used for providing pulsed infrared radiation which may, especially, be used in a Fourier transform (FT) infrared spectrometer. However, further uses of the device according to the present invention may still be conceivable.

In a further aspect of the present invention, a method for generating radiation, in particular pulsed radiation, specifically within the infrared spectral range, is disclosed. The method as disclosed herein comprises the following steps, which may, preferably, be performed in the given order, commencing with step a) and finishing with step e), wherein consecutive steps may, at least partially, be performed in a simultaneous manner. Accordingly, in a preferred embodiment, step c) may, thus, be performed prior to step d), whereby the electrical current may be terminated before the mount or the portion thereof may be moved in a manner that it touches a heat sink. However, in a further preferred embodiment, step d) may be followed by step c), such that the mount or the portion thereof may be moved in a manner that it touches the heat sink before the electrical current may be terminated. Further, in order to generate more than one pulse of radiation, the method may, specifically, be resumed after step e) by resuming the performance of the method with step b), thereby generating consecutive pulses of radiation. Further, additional steps can be performed which are not listed here.

The method according to the present invention comprises the following steps:
- a) providing a mount, wherein the mount carries at least one radiation emitting element, and wherein the mount or a portion thereof is movable;
- b) providing an electrical current, wherein the electrical current heats the at least one radiation emitting element in a manner that the at least one radiation emitting element generates radiation;
- c) terminating the electrical current, whereby the at least one radiation emitting element cools down;
- d) moving the mount or the portion thereof in a manner that it touches a heat sink, whereby the at least one radiation emitting element cools down; and
- e) removing the mount from touching the heat sink.

In a further aspect, the present invention refers to computer program product which comprises executable instructions for performing the method for generating radiation as described elsewhere herein. In particular, the computer program product comprising executable instructions may fully or partially be integrated into an electronic device, such as the control unit, in particular into an electronic communication unit, specifically a smartphone or a tablet, or a spectrometer device. Herein, the computer program product may be capable of performing the method in a relationship with the data processing device already comprised by the smartphone for various purposes. By way of example, the method may be performed as an application, also denoted as "app", on the smartphone for this purpose. Alternatively, the computer program product may be capable of performing the method in a relationship with the spectrometer control unit already comprised by the spectrometer device. In addition, further kinds of electronic devices may also be conceivable.

For further details concerning the spectrometer device, the method for generating radiation, and the computer program product according to the present invention, reference may be made to the description of the device for generating radiation as provided elsewhere herein.

The device and the method for generating radiation as disclosed herein have considerable advantages over prior art. In particular, the device can be used as an improved but easy-to-manufacture and, thus, cost-effective thermal radiation source designed for generating infrared radiation, in particular pulsed infrared radiation having a modulation frequency of 100 Hz and more. By mechanically actuating the at least one radiation emitting element which has a small thermal mass and bringing it into thermal contact with the large thermal mass as provided by the heat sink, both fast heating and fast cooling of the of the small thermal mass of the at least one radiation emitting element can, thus, be achieved.

Summarizing, in the context of the present invention, the following embodiments are regarded as particularly preferred:

Embodiment 1: A device for generating radiation, wherein the device comprises:
- at least one radiation emitting element, wherein the radiation emitting element is designated for generating radiation upon being heated by an electrical current;
- a mount, wherein the mount carries the at least one radiation emitting element, and wherein the mount or a portion thereof is movable; and
- a heat sink, wherein the heat sink is designated for cooling the mount and the at least one radiation emitting element being carried by the mount upon being touched by the mount.

Embodiment 2: The device according to the preceding Embodiment, wherein the radiation emitting element is or comprises a heatable element.

Embodiment 3: The device according to the preceding Embodiment, wherein the heatable element is selected from at least one of a metal filament, a metal film, a graphite filament, a graphite film.

Embodiment 4: The device according to the preceding Embodiment, wherein the metal filament or the metal film comprises a metal selected from at least one of tungsten or NiCr.

Embodiment 5: The device according to any one of the two preceding Embodiments, wherein the graphite filament or the graphite film comprises a graphite.

Embodiment 6: The device according to any one of the preceding Embodiments, wherein the radiation emitting element is heatable by application of an electrical current.

Embodiment 7: The device according to any one of the preceding Embodiments, wherein the mount is switchable between a free-standing configuration and touching the heat sink.

Embodiment 8: The device according to any one of the preceding Embodiments, wherein the mount is selected from at least one of a movable mount and a flexible mount.

Embodiment 9: The device according to any one of the preceding Embodiments, wherein the mount is or comprises a flexible or a movable micro-electromechanical structure.

Embodiment 10: The device according to the preceding Embodiment, wherein the micro-electromechanical structure is selected from at least one of a cantilever, a membrane, or a movable electrode.

Embodiment 11: The device according to the preceding Embodiment, wherein the micro-electromechanical structure is integrated in a cavity.

Embodiment 12: The device according to the preceding Embodiment, wherein the cavity is a Fabry-Perot cavity.

Embodiment 13: The device according to any one of the preceding Embodiments, wherein the mount is or comprises a bimetallic structure.

Embodiment 14: The device according to the preceding Embodiment, wherein the bimetallic structure is designed in a manner that it moves away from the heat sink upon being impinged by heat provided by the at least one radiation emitting element.

Embodiment 15: The device according to any one of the preceding Embodiments, wherein the heat sink is selected from at least one of a metal block or a base of the device.

Embodiment 16: The device according to the preceding Embodiment, wherein the metal block is or comprises a cooper block.

Embodiment 17: The device according to any one of the preceding Embodiments, further comprising a cooling unit for cooling the heat sink.

Embodiment 18: The device according to any one of the preceding Embodiments, wherein the cooling unit is an active cooling unit or a passive cooling unit.

Embodiment 19: The device according to the preceding Embodiment, wherein the active cooling unit comprises at least one of a coolant, a fan, or a thermoelectric device.

Embodiment 20: The device according to any one of the preceding Embodiments, further comprising at least one optical filter for filtering the generated radiation.

Embodiment 21: The device according to the preceding Embodiment, wherein the optical filter is selected from at least one of an absorption filter or a photonic crystal.

Embodiment 22: The device according to the preceding Embodiment, wherein the absorption filter is selected from a high pass filter, a low pass filter, or band pass filter.

Embodiment 23: The device according to any one of the preceding Embodiments, further comprising a volume filled with inert gas or comprising a vacuum.

Embodiment 24: The device according to the preceding Embodiment, wherein at least some components of the device, in particular the radiation emitting element, the mount and a surface of the heat sink designed for being touched by the mount, are comprised by the volume.

Embodiment 25: The device according to any one of the two preceding Embodiments, wherein the volume has a confinement, preferably a bulb.

Embodiment 26: The device according to the preceding Embodiment, wherein the confinement comprises a material which is adapted to the emission spectrum of the generated radiation.

Embodiment 27: The device according to the preceding Embodiment, wherein the material is selected from glass or fused quartz Embodiment 28: The device according to any one of the preceding Embodiments, wherein the device is adapted for generating radiation having a wavelength of 790 nm to 1000 µm.

Embodiment 29: The device according to any one of the preceding Embodiments, wherein the device is designated for generating pulsed radiation.

Embodiment 30: The device according to the preceding Embodiment, wherein the pulsed radiation exhibits a modulation frequency, preferably of at least 50 Hz, 100 Hz, 200 Hz, 250 Hz, 500 Hz, 1 kHz or above.

Embodiment 31: The device according to any one of the preceding Embodiments, further comprising a control unit.

Embodiment 32: The device according to any one of the preceding Embodiments, wherein the control unit is designed for controlling at least one parameter related to the device.

Embodiment 33: The device according to any one of the preceding Embodiments, wherein the at least one parameter is selected from a duration of the heating phase, an amount of electrical current provided to the at least one radiation emitting element, a duration of the cooling phase, an amount of electrical voltage applied to the mount, or a modulation frequency.

Embodiment 34: A spectrometer device comprising:
an illumination source, wherein the illumination source is designated for illuminating an object in order to record a spectrum of the object;
a detector array comprising a plurality of radiation sensitive sensors, wherein the detector array is designated for recording the spectrum of the object by generating at least one sensor signal;
a spectrometer control unit, wherein the spectrometer control unit is designated for determining the spectrum of the object from the at least one sensor signal, wherein the illumination source comprises the device for generating radiation according to any one of the preceding Embodiments.

Embodiment 35: The spectrometer device according to the preceding Embodiment, wherein the device for generating radiation is comprised by the spectrometer device in an integrated fashion.

Embodiment 36: The spectrometer device according to any one of the preceding Embodiments related to the spectrometer device, wherein.

Embodiment 37: A method for generating radiation, wherein the method comprises the following steps:
a) providing a mount, wherein the mount carries at least one radiation emitting element, and wherein the mount or a portion thereof is movable;
b) providing an electrical current, wherein the electrical current heats the at least one radiation emitting element in a manner that the at least one radiation emitting element generates radiation;
c) terminating the electrical current, whereby the at least one radiation emitting element cools down;

d) moving the mount or the portion thereof in a manner that it touches a heat sink, whereby the at least one radiation emitting element cools down; and e) removing the mount or the portion thereof from touching the heat sink.

Embodiment 38: The method according to the preceding Embodiment, wherein after step e) the method is resumed by step b), whereby consecutive pulses of radiation are generated.

Embodiment 39: The method according to the preceding Embodiment, wherein the pulsed radiation comprises a modulation frequency which equals a reciprocal value of a time interval used for consecutively performing steps b) to e).

Embodiment 40: The method according to any one of the preceding Embodiments related to the method, wherein the mount is moved away during step e) from touching the heat sink into a free-standing configuration.

Embodiment 41: The method according to the preceding Embodiment, wherein the free-standing configuration is achieved by applying an electrical voltage to the mount or the portion thereof.

Embodiment 42: The method according to any one of the preceding Embodiments related to the method, wherein the heat sink is cooled.

Embodiment 43: The method according to the preceding Embodiment, wherein the heat sink is cooled actively or passively.

Embodiment 44: The device according to the preceding Embodiment, wherein the heat sink is cooled actively by using at least one of a coolant, a fan, or a thermoelectric device.

Embodiment 45: The method according to the preceding Embodiment, wherein the generated radiation comprises a wavelength selected from 780 nm to 1000 µm.

Embodiment 46: A computer program product which comprises executable instructions for performing the method according to any one of the preceding Embodiments related to the method.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1A:
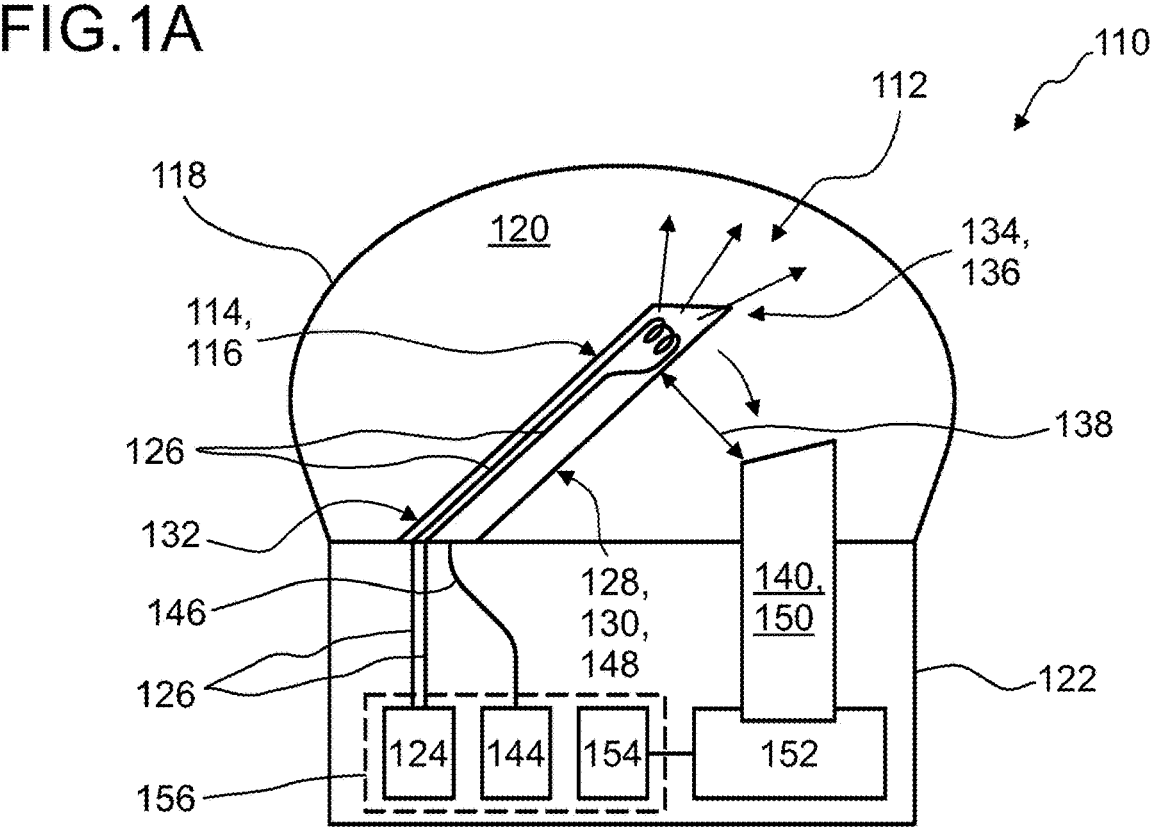
FIGS. 1A and 1B illustrate a preferred exemplary embodiment of a device for generating radiation according to the present invention.
Figure 1B:
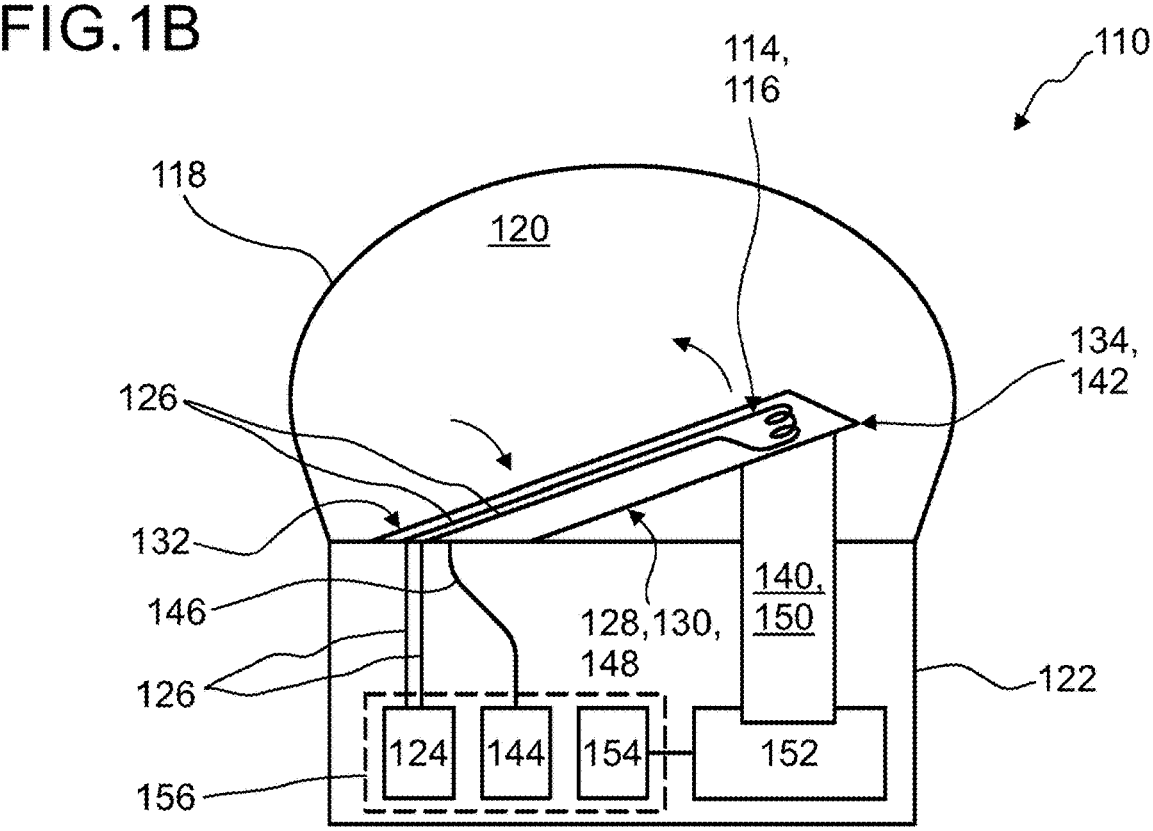

FIGS. 1A and 1B each illustrates, in a highly schematic fashion, an exemplary embodiment of device 110 for generating radiation 112 according to the present invention. Without limiting the scope of the present invention, a metal filament 114 is used in the exemplary embodiments of FIGS. 1 and 2 as radiation emitting element 116. As an alternative, other kinds of radiation emitting elements 116, preferably a metal film, a graphite filament, or a graphite film, especially a radiation emitting surface of a thermal infrared emitter (not depicted here) as described above in more detail, may also be used in a similar fashion within the exemplary embodiments of FIGS. 1 and 2.

As further schematically depicted in each of FIGS. 1A and 1B, the radiation emitting element 116 can be protected by a bulb 118, in particular of glass or fused quartz, wherein the metal filament 114, which may, specifically, comprise tungsten or NiCr, is located in a volume 120 confined by the bulb 118 which is preferably filled with inert gas or comprises a vacuum. In this exemplary embodiment, the bulb is attached to a base 122 of the device 110. However, other kinds of protecting the radiation emitting element 116 are conceivable.

For a purpose of the generating the desired radiation 112, the metal filament 114 is impinged by an electrical current, which is provided here by a current source 124 via corresponding leads 126, in a fashion that a heating of the metal filament 114 results in an emission of photons over a considerably wide spectral range, especially covering a portion of the infrared (IR) spectral range. As generally used, the IR spectral range covers wavelengths of 780 nm to 1000 µm, wherein a range of 1.5 µm to 15 µm or a portion thereof may, particularly, be preferred.

As further illustrated in FIGS. 1A and 1B, the device 100 according to the present invention further comprises a mount 128, wherein the mount 128 carries the at least one radiation emitting element 116. In accordance with the present invention, the mount 128 or a portion thereof is movable. In the exemplary embodiment of FIG. 1, the mount is provided as a flexible mount 130 which is arranged in a fashion that a fixed portion 132 of the mount 128 is fixed to the base 122 of the device 110 while a flexible portion 134 of the flexible mount 130 is adjustable between a first location 136 as depicted in FIG. 1A at which it is separated, in particular by a gap 138, from a heat sink 140, to the second location 142 as depicted in FIG. 1B at which it is coupled to the heat sink 140 by touching the heat sink 140. As can be derived from a comparison between FIGS. 1A and 1B, the flexible portion 134 of the flexible mount 130 can, thus, assume the first location 136 during a heating phase as depicted in FIG. 1A and the second location 142 during a cooling phase as shown in FIG. 1B, thus, acting as a "switch" being switchable between the first location 136 and the second location 142 and, vice versa. As a result, the radiation emitting element 116 can, on one hand as illustrated in FIG. 1A, be heated during the heating phase along which the flexible portion 134 of the flexible mount 130 assumes the first location 136 at which it is separated from the heat sink 140 by the gap 138, and, on the other hand as illustrated in FIG. 1B, be effectively cooled during the cooling phase along which the flexible portion 134 of the flexible mount 130 assumes the second location 142 at which it touches the heat sink 140. Consequently, the flexible portion 134 of the flexible mount 130 allows performing both a heating process and a cooling process of the radiation emitting element 116 without impeding each other, thus, contributing to an effective heating and subsequent cooling of the radiation emitting element 116 element, whereby the desired pulsed radiation source which, especially, covers a portion of the infrared spectral range, is provided.

In order to move the flexible portion 134 of the flexible mount 130 from the first position 136 where it assumes a free-standing configuration to the second position 142 in order to touch the heat sink 140, or to keep the flexible mount 130 in the position 142 in which the flexible portion 134 of the flexible portion 134 of the flexible mount 130 touches the heat sink 140, an electrical voltage can be applied to the flexible mount 130, preferably during the initial cooling phase or during the whole cooling phase. As an alternative, the electrical voltage may be applied during the whole heating phase for keeping the radiation emitting element 116 separated from the heat sink 140. As indicated in FIGS. 1A and 1B, the electrical voltage can be applied to the flexible mount 130 in the schematically depicted embodiment by using a voltage source 144 and via at least one corresponding lead 146.

As a further alternative, the flexible mount 130 may be a bimetallic structure (not depicted here) as described above in more detail. Accordingly, the bimetallic structure of the flexible mount 130 may comprise at least two different kinds of metals, preferably in form of bimetallic strips, which are joined together. By altering the temperature, the difference in thermal expansion rates for each metal may, preferably, result in a movement of the flexible portion 134 of the bimetallic structure while the fixed portion 132 of the bimetallic structure can be maintained at the base 126 of the device 110. As a consequence, the bimetallic structure may, preferably, be designed in a manner that it may move away from the heat sink 140 upon being impinged by heat provided by the radiation emitting element 116. In this kind of arrangement, the flexible mount 130 may, therefore, be automatically separated from the heat sink 140 during the heating phase whereas it may touch the heat sink 140 during the cooling phase, without any external triggering, thus providing a self-resonant pulsed infrared emitter.

In the preferred embodiment as depicted in FIGS. 1A and 1B, the flexible mount 130 which carries the radiation emitting element 116 is arranged in form of a cantilever 148. However, other forms, in particular that of a membrane (not depicted here) may also be feasible. Further in this embodiment, the heat sink 140 is as arranged as a metal block 150, preferably a copper block, which allows receiving a large amount of heat from the radiation emitting element 116 via the flexible mount 130, especially owing to the high thermal conductivity of the material copper. However, other materials having a considerable thermal conductivity, can also be used for this purpose. In order to further enhance the cooling effect of the heat sink 140, the heat sink 140 may be in thermal contact with a cooling unit 152, wherein the cooling unit may be an active cooling unit, such as a liquid or a gaseous coolant, a fan, or a thermoelectric device; or a passive cooling unit, such as a further heat sink, a further body attached to the heat sink 140, such as the base 122 of the device 110, or an arrangement by which a dissipation of the heat is supported by a particularly selected form of the heat sink 140 and/or by the environment of the heat sink 140. The cooling unit may be controlled by a cooling control unit 154. As schematically depicted in FIGS. 1A and 1B, the cooling control unit 154 may be comprised by a control unit 156 together at least with the current source 124 and the voltage source 144. However, further arrangements are conceivable.

Further, the device 110 may, in addition, to the components as illustrated in FIGS. 1A and 1B comprise at least one further components not depicted here, such as a cavity or an optical filter. Herein, mount may be integrated in a cavity, wherein the cavity provide a linear optical resonator, wherein a length of the resonator is adapted to determine wavelengths allowed within the resonator. In particular, the cavity may be Fabry-Perot cavity which comprises at least two highly-reflective mirrors, wherein at least one of the mirrors has a small transmissivity, thus, allowing a small portion of the radiation 112 which is captured in the cavity to leave the cavity as the emitted radiation 112. The optical filter may be used for filtering the generated radiation 112, wherein the optical filter is may be from an absorption filter, in particular a high pass filter, a low pass filter, or band pass filter; or a photonic crystal as described elsewhere herein. As a result, the device 110 which is equipped with a cavity, in particular a Fabry-Perot cavity, and/or an optical filter is able to provide a filtered and tunable infrared emission.

In a further preferred embodiment (not depicted here), a spectrometer device may comprise the device 110 of the present invention, preferably in an integrated fashion, wherein the functions of control device 156 can be provided by a spectrometer control device already present in the spectrometer device. However, further kinds of applications may also be feasible.

Figure 2A:
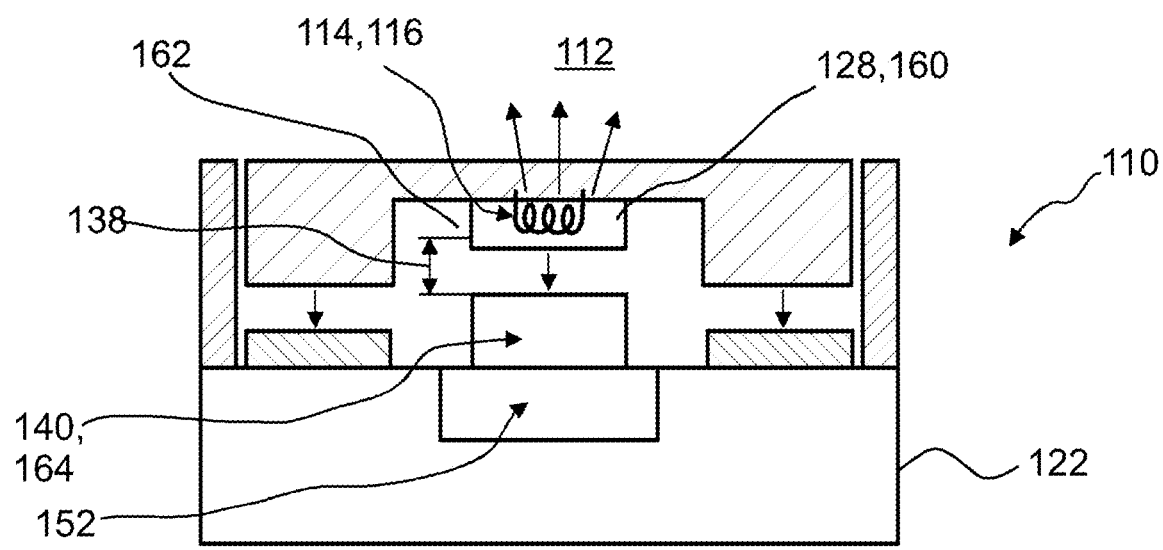
FIGS. 2A and 2B illustrate a further preferred exemplary embodiment of the device for generating radiation according to the present invention.
Figure 2B:
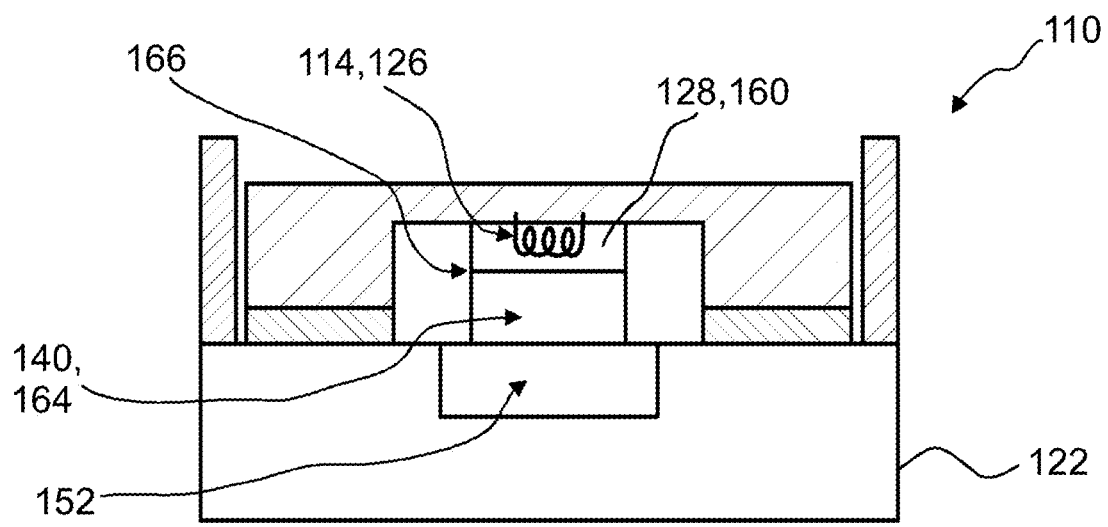

FIGS. 2A and 2B each illustrates, in a highly schematic fashion, a further preferred exemplary embodiment of the device 110 according to the present invention. In this embodiment, the whole mount 128 can be provided as a movable electrode 160 which is movable from a first location 162 as depicted in FIG. 2A, wherein it is separated from the heat sink 140, in particular by the gap 138, by applying an electrical voltage which may generate an electrostatic force that pulls the movable electrode 160 to a fixed electrode 164 which is used as the heat sink 140 at a second location 166 as shown in FIG. 2B, where the movable electrode 160 is now coupled to the heat sink 140 by touching the heat sink 140.

In particular, suitable contact materials are used in this particular embodiment for high temperature operation of the device 110 without melting, fusing or welding of the contacts. Since no electrical connection is required for the coupling and/or decoupling the moveable electrode 160 to and/or from the fixed electrode 166, metal oxide layers with operation temperatures above 1000° C., such as aluminum oxide, could be used. A further well-suited material could be silicon since it provides a high electrical resistance which is advantageous for the mount 128.

For further details with respect to the embodiment as schematically depicted in FIGS. 2A and 2B reference may be made to the description of the embodiment as illustrated in FIGS. 1A and 1B as provided above.

However, it is indicated here that, apart from the preferred exemplary embodiments of the device 110 according to the present invention as shown in FIG. 1 or 2, further embodiments of the device 110 may also be conceivable.

Figure 3:
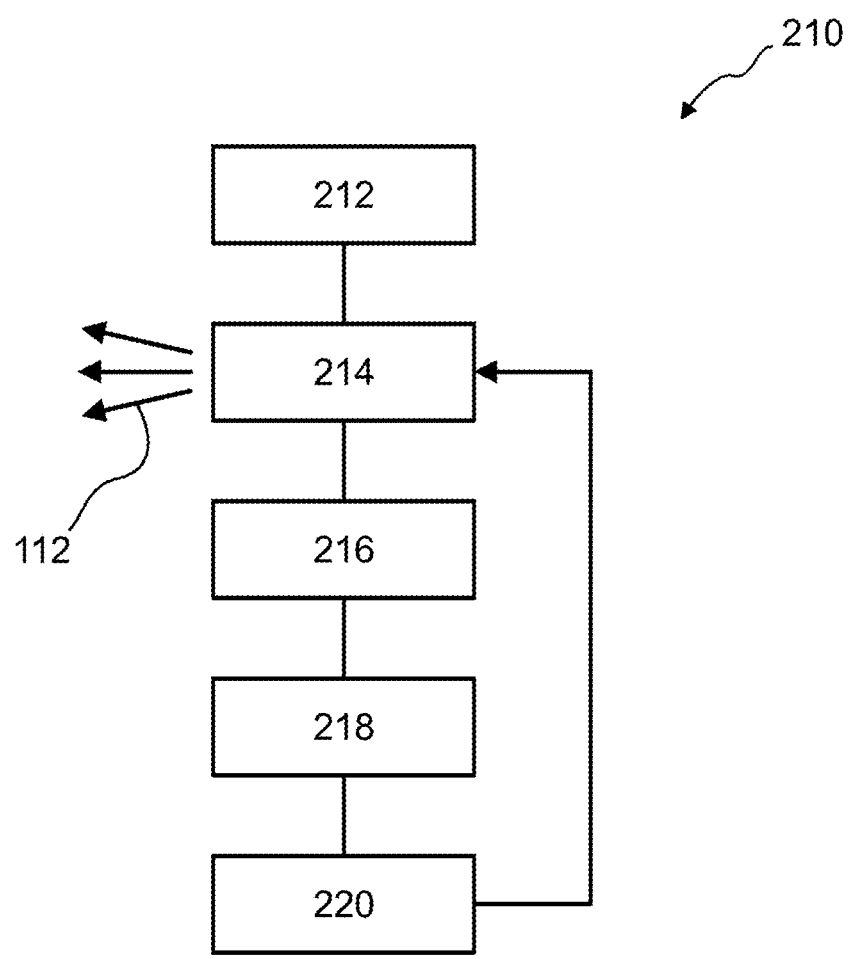
FIG. 3 illustrates a preferred exemplary embodiment of a method for generating radiation according to the present invention.

FIG. 3 illustrates a preferred exemplary embodiment of a method 210 for generating radiation 112 according to the present invention.

In a providing step 212 the mount 128 is provided according to step a) of the method 210, wherein the mount 128 carries the radiation emitting element 116, and wherein the mount 128 or the flexible portion 134 of the mount 128 is movable.

In a heating step 214 the mount 128 is heated in accordance with step b) of the method 210 by the electrical current which heats the radiation emitting element 116 in a manner that the radiation emitting element 116 generates the desired radiation 112.

In a terminating step 216 the electrical current is terminated in accordance with step c) of the method 210, whereby the radiation emitting element 116 slowly starts cooling down.

In a cooling step 218 the mount 128 or the flexible portion 134 of the mount 128, whichever is movable, is moved in a fashion in accordance with step d) of the method 210 that it touches the heat sink 140, whereby the radiation emitting element 116 rapidly cools down.

In an alternative embodiment (not depicted here), the mount 128 or the flexible portion 134 of the mount 128, whichever is movable, is, firstly, moved in the cooling step 218 in a fashion in accordance with step d) of the method 210 that it touches the heat sink 140, whereby the radiation emitting element 116 slowly starts cooling down. Only subsequently, the electrical current is terminated in the terminating step 216 in accordance with step c) of the method 210 in a manner that the radiation emitting element 116 rapidly cools down.

Irrespective of an order in which the terminating step 216 and the cooling step 218 are performed, the electrical current is terminated in a removing step 220 in accordance with step e) of the method 200, wherein the mount 128 or the flexible portion 134 of the mount 128, whichever is movable, is removed from touching the heat sink 140, whereby the further cooling of the radiation emitting element 116 stops.

In the particularly preferred embodiment of the method 210 as depicted in FIG. 3, the method 210 is resumed after the removing step 210 according to step e) by performing the heating step 214 according to step b) again, in which manner consecutive pulses of the radiation 112 can be generated. In particular, a modulation frequency can be assigned to the pulsed radiation 112, wherein the modulation frequency equals a reciprocal value of a time interval which is used for consecutively performing steps b) to e).

LIST OF REFERENCE NUMBERS 110 device
112 radiation
114 metal filament
116 radiation sensitive element
118 bulb
120 volume
122 base
124 current source
126 lead
128 mount
130 flexible mount
132 fixed position
134 flexible portion
136 first location
138 gap
140 heat sink
142 second location
144 voltage source
146 lead
148 cantilever
150 metal block
152 cooling unit
154 cooling control unit
156 control unit
160 movable electrode
162 first location
164 fixed electrode
166 second location
210 method
212 providing step
214 heating step
216 terminating step
218 cooling step
220 removing step

The invention claimed is:

1. A device for generating radiation, wherein the device comprises:
    at least one radiation emitting element, wherein the radiation emitting element is designated for generating radiation upon being heated by an electrical current;
    a mount, wherein the mount carries the at least one radiation emitting element, and wherein the mount or a portion thereof is movable; and
    a heat sink, wherein the heat sink is designated for cooling the mount and the at least one radiation emitting element being carried by the mount upon being touched by the mount.

2. The device according to claim 1, wherein the radiation emitting element is or comprises a heatable element selected from the group consisting of a metal filament, a metal film, a graphite filament, and a graphite film.

3. The device according to claim 2, wherein the metal filament or the metal film comprises tungsten or NiCr, or wherein the graphite filament or the graphite film comprises graphite.

4. The device according to claim 1, wherein the mount is or comprises a flexible or a movable micro-electromechanical structure selected from the group consisting of a cantilever, a membrane, and a movable electrode.

5. The device according to claim 4, wherein the mount is or comprises a bimetallic structure.

6. The device according to claim 5, wherein the bimetallic structure is designed in a manner such that it moves away from the heat sink upon being impinged by heat provided by the at least one radiation emitting element.

7. The device according to claim 1, wherein the mount is a flexible mount.

8. The device according to claim 7, wherein the mount is or comprises a bimetallic structure.

9. The device according to claim 8, wherein the bimetallic structure is designed in a manner such that it moves away from the heat sink upon being impinged by heat provided by the at least one radiation emitting element.

10. The device according to claim 1, wherein the heat sink is selected from the group consisting of a metal block and a base of the device.

11. The device according to claim 1, further comprising a cooling unit designated for cooling the heat sink.

12. The device according to claim 1, further comprising a Fabry-Perot cavity.

13. A method for generating radiation, wherein the method comprises the following steps:
    a) providing a mount, wherein the mount carries at least one radiation emitting element, and wherein the mount or a portion thereof is movable;
    b) providing an electrical current, wherein the electrical current heats the at least one radiation emitting element in a manner such that the at least one radiation emitting element generates radiation;
    c) terminating the electrical current, whereby the at least one radiation emitting element cools down;
    d) moving the mount or the portion thereof a manner such that it touches a heat sink, whereby the at least one radiation emitting element cools down; and
    e) removing the mount or the portion thereof from touching the heat sink.

14. The method according to claim 13, wherein after step e) the method is resumed by step b), whereby consecutive pulses of radiation are generated.

15. The method according to claim 14, wherein the pulsed radiation comprises a modulation frequency which equals a reciprocal value of a time interval used for consecutively performing steps b) to e).

16. The method according to claim 14, wherein the mount is moved away from touching the heat sink into a free-standing configuration, wherein the free-standing configuration is achieved by applying an electrical voltage to the mount or the portion thereof.

17. A computer program product which comprises executable instructions for performing the method according to claim 14.

* * * * *